United States Patent Office 3,287,298
Patented Nov. 22, 1966

3,287,298
OXYGEN-CONVERTIBLE BLOCK COPOLYMERS OF POLYMERIC DIANIONS
Gaetano F. D'Alelio, South Bend, Ind., assignor, by direct and mesne assignments, to Dal Mon Research Co., Cleveland, Ohio, a corporation of Delaware
No Drawing. Filed Dec. 28, 1962, Ser. No. 248,150
21 Claims. (Cl. 260—23)

This invention is a continuation-in-part of my copending applications Serial Nos. 207,011, 207,012 and 207,013, filed on July 2, 1962, the latter now Patent No. 3,203,915.

This invention relates to novel polymeric compositions particularly suited for coating and related applications.

The new polymers may be classified as air-drying or air-convertible polmyers by an analogy to the natural and synthetic drying and semi-drying oils, the unsaturated fatty acid-modified alkyd resins, etc., which are considered as possessing air-drying properties. In the coating and related arts, the terms air-drying or air-convertibility do not refer to the physically dry state which results from the evaporation of a solvent, as in a lacquer, or from a coating composition, such as a varnish, enamel or paint, but to the formation of an insoluble polymer resulting from the reaction of oxygen in the air with the oils or resins containing a multiplicity of unsaturated groups in their structures.

To be suitable as coating compositions, this air convertibility should occur at ordinary temperatures such as between 70 and 120° F. although the rate will be much slower at the lower temperatures and accelerated at the higher temperatures in this range. In some cases, it is desirable to accelerate the conversion by using temperatures as high as 212° F. or even 260° F. This conversion can be accelerated also at ordinary or at higher temperatures by the addition of catalytic quantities of metal salts, known in the coating arts as driers, such as cobalt, manganese and lead salts, etc., of the fatty acids, linoleic acid, naphthenic acids, resin acids, etc., as well known and commonly used in this art.

It is an object of this invention to prepare polymeric compositions which are fusible and/or soluble but which, on exposure to oxygen, oxygen-containing gases, or other forms of free or liberated oxygen, become converted to insoluble polymers.

It is, then, an object of this invention, to prepare polymeric compositions which are air-convertible at, at least, ordinary temperatures. It is also an object of this invention to prepare air-convertible polymeric compositions in which the convertibility is accelerated by metallic driers. More specifically, this invention comprises block copolymers of at least two monomers, in which the block copolymers comprise a chain of A monomomers

as the core or nucleus of the polymer chain, to both ends of which are attached block B monomers, thus

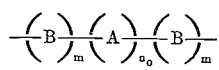

wherein $n_o$ represents a numerical value of at least 4 and can be as high as 100,000 or more, and $m$ represents a numerical value of at least one to as high as $n_o$ and A and B represent the structural units derived from A monomers and B monomers respectively. This invention also comprises the preparation of

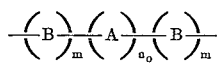

block copolymers in which the A and B blocks differ substantially in their chemical properties, and in which the B blocks contain chemically functional groups which permit post-reaction to be performed selectively only in the B block portions of the copolymer and not in the A block portion of the copolymer. This reactivity of the B block originates from chemical structures originally present in the B monomers. It is therefore a purpose of this invention to prepare block copolymers by a process wherein the functionally active groups in the B monomers necessary to confer reactivity to the copolymer are not lost or otherwise caused to undergo premature reaction or degradation in the copolymerization process.

Monomers of Class A may be written as

and those of Class B as

in which R, P, and Q are fully defined hereinafter, and for the present purposes of demonstration, the A monomers may be illustrated by styrene, ethyl acrylate, methyl methacrylate, etc., and the B monomers by oleyl methacrylate, linolenyl vinyl-benzoate, etc.

Some typical block copolymers of this invention, using these monomers according to the structure

are
(Polymer I)

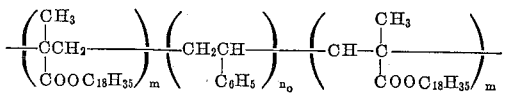

(Polymer II)

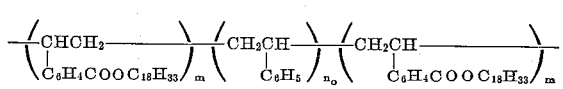

(Polymer III)

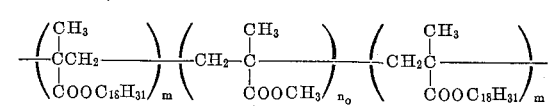

In these illustrative block polymers, it will be noted that the functional groups, $C_{18}H_{35}$, $C_{18}H_{33}$ and $C_{18}H_{31}$ are terminal in the copolymer and that the cores

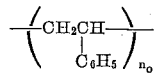

and

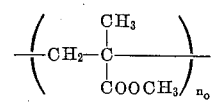

are not functional.

These three polymers are all oxygen-reactive and can be converted to an insoluble, infusible state by oxygen alone, or in the presence of catalysts, with or without heat. Since the functional or reactive groups are terminal, they are readily available for post-reaction, and differ in this respect from statistical or random copolymers prepared from the same monomers in which many of the functional groups are sterically hindered or lost within the polymer mass and unavailable for post-reactions. The block copolymers of this invention also differ from copolymers of only two blocks,

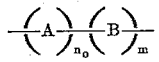

in which the reactions are performed on only one end of the chain, as for example, when such a polymer is cured or converted, the

block of the polymer is still accessible to the swelling effect of solvents.

The block copolymers of this invention are prepared by reacting a polymeric dianion,

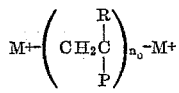

wherein $M^+$ is a positive counter ion, typically an alkali metal, with monomers of the formula

wherein Q represents a post-reactable function. Thus,

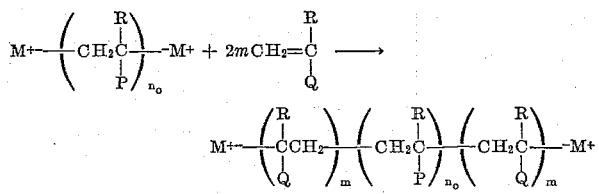

The terminal valencies of the block copolymers of this invention are occupied by the counter ions, $M^+$ and can be used as such, or freed of the $M^+$ by reaction with protolytic substances such as water, alcohols, acids, amines, etc. to produce block copolymers of this invention whose terminal valencies are hydrogen, e.g.

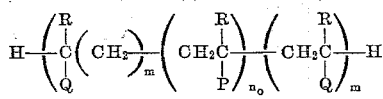

The terminal groups can also be —COOM, as when the dianion is neutralized with $CO_2$, or —COOR when a chlorocarbonic ester, e.g., $ClCOOC_2H_5$ is used to neutralize the $M^+$ ion, or a hydrocarbon radical R, such as ethyl, butyl, benzyl, etc., when a hydrocarbon halide RX is used to neutralize the dianion, etc. For the purposes of this invention the nature of the terminal valence is not critical, since air-convertibility resides in the

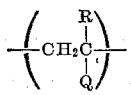

unit in the copolymer.

It is also possible in accordance with this invention, to prepare the block copolymers of this invention by grafting at least one monomer of the class of

monomers to each end of a polymeric dianion of the general formula

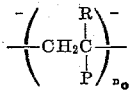

and to accomplish this synthesis through an anionic polymerization mechanism. This is in marked contrast with grafting a monomer to a polymeric mono-anion whether or not the grafter monomer contains the Q function, wherein the grafted monomer is propagated as a block only to one end of the polymer as shown hereinabove.

By an anionic polymerization is meant a polymerization in which the propagation occurs by the progressive addition of monomers to an anion, at a specific rate, $k_p$, such as

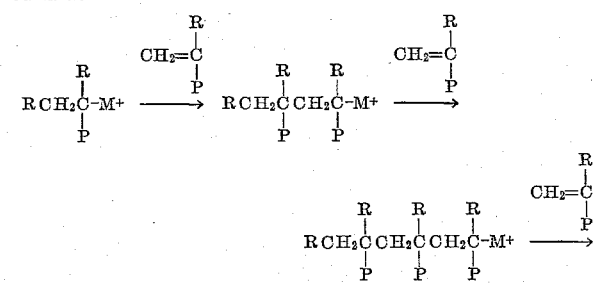

in which $M^+$ is a positive counter ion, typically an alkali metal. Many such polymerizations are known. This propagation step is preceded by an initiation step which can be brought about about in numerous ways. The anion polymerization may be initiated by an alkali or alkaline earth metal hydride such as $NaH$, $LiH$, $CaH_2$, $MgH_2$, $KH$, $CsH$, etc. Such hydrides can also be in the form of complexes, for example, with other hydrides, e.g., $KAlH_4$, $LiAlH_4$, etc. By designating such hydrides as MH, the initiating step is represented as

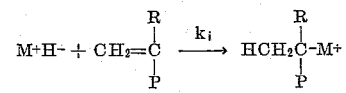

When an alkali metal hydrocarbon, $R_xM$ is used the initiating step is given as

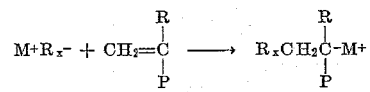

in which case the cation M represents Li, Na, K, Ca, Cs, etc., and the anion, $R_x^-$ represents methyl, ethyl, propyl, isopropyl, butyl, amyl, isoamyl, cyclohexyl, benzyl, triphenyl methyl, octyl, etc., preferably containing no more than about 12 carbon atoms in the anion. A few typical examples of $MR_x$ are BuLi, $(C_6H_5)_3CNa$,

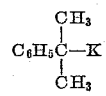

$C_6H_5CH_2Cs$, $CH_2=CHCH_2Li$, etc.

A Grignard reagent also may be used to initiate the anionic polymerization, thus

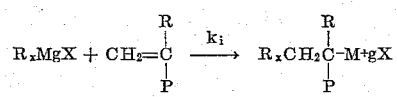

Illustrative examples of $R_xMgX$ in which X is a halogen and $R_x$ is as defined above are butyl magnesium bromide, vinyl magnesium bromide, allyl magnesium chloride, phenyl magnesium bromide and chloride, etc. In most cases, and with most monomers, such initiations produce only mono-anions which are propagated as mono-anions and accordingly, the blocks occur at only one end of the polymer chain. In most cases such blocks offer little or no advantage over a random copolymer.

However, there are numerous initiating systems which produce dianions in the initiating stage and these dianions propagate by the further addition of monomer at both ends to produce polymeric dianions suitable for the purposes of this invention. For example, with initiators of the formula $R_xM$, when $R_x$ represents an aromatic ring such as naphthalene, dianions are obtained.

This is readily explained by a series of reactions involving ion radicals which couple to form dianions, thus:

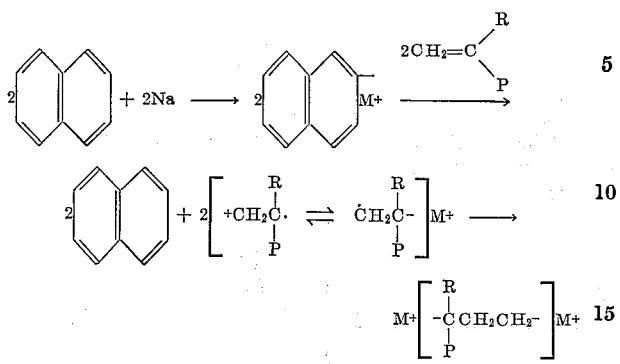

This same type of dianion is formed with anthracene, phenathrene, naphthacene, acenaphthalene, perylene, tertaphenyl ethylene, diphenyl acetylene, stilbene, etc.

The free alkali metals can also be used to initiate anionic polymerizations, especially when the metal, M°, gives up an electron to form an ion radical of the monomer, thus

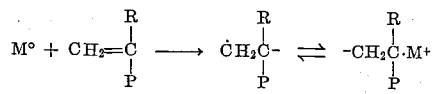

The ion radicals couple to form a dianion, thus

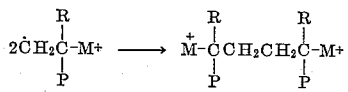

as a step in the initiating machanism.

The alkali metal in liquid ammonia, and in amines are also effective anionic initiators and they can function in two ways, e.g., in the case of potassium, sodium or calcium in liquid ammonia, the amide which results from the reaction of the metal with ammonia acts as the initiator. Thus

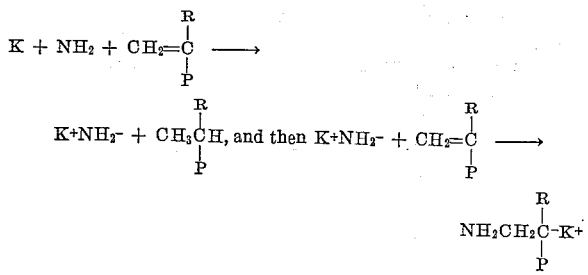

However, in the case of lithium, an ion radical is formed which acts as the initiator. Thus, $$Li + 2NH_3 \rightarrow Li^+(NH_3) + e^-(NH_3)$$

where $e^-$ is an electron, and then

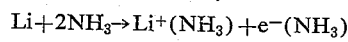

In a similar way, dianionic initiation is brought about by ketyls which are the reaction products of an alkali or alkali metal with a ketone such as benzophenone in ethers. Thus

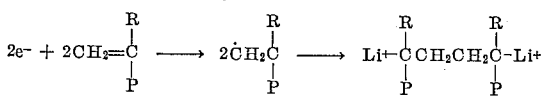

which then reacts with the monomer

to form a dianion

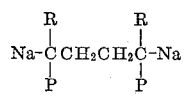

and regenerate the ketone. Dianions are also produced when α-methyl styrene is reacted with potassium, to produce a dimer, which structure is considered as being

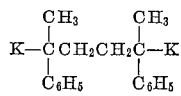

If it is desired, prior to the addition of

monomers to increase the size of the A block, then more

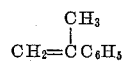

is added to the dimer, thus

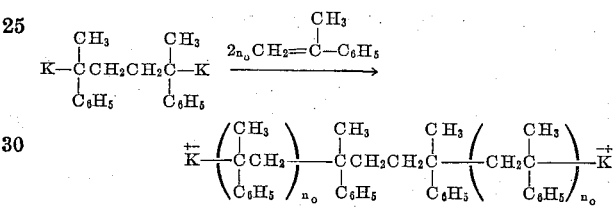

The same type of dianions are produced by starting with styrene dimers, styrene tetramers, etc.

Another class of dianions is that derived from the reaction of 1,3-dinenes, with an alkali metal such as butadiene, isoprene, 2-phenylbutadiene-1,3; 2,3-diphenyl butadiene, triphenyl butadiene; tetraphenyl butadiene; etc., as illustrated by butadiene, $$CH_2=CH-CH=CH_2 + 2M \rightarrow$$
$$M^{+-}CH_2CH=CHC^-H_2M^+.$$

Individual dianions are more difficult to prepare from the diene-1,3 compounds than some of the other dianions described hereinabove since other side reactions can occur, such as the formation of dimers, trimers, tetramers, etc. For example, $$2M + nCH_2=CHCH=CH_2 \rightarrow$$
$$M^{+-}(CH_2CH=CHCH_2)_n^-M^+.$$

This is especially true when Li metal is used which dianions in many respects, are similar to the α-methyl styrene dianions prepared using Li or K. When sodium or potassium is used, some 1,2 polymerization occurs with the dienes, such as

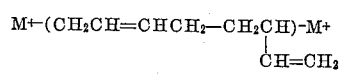

In the above illustrations, the dianions become part of the central block of the polymer chain, and if the dianion is derived from a monomer which is desired in the central block, then the central block can be prepared either in steps or in a single operation. However, if the dianion is not derived from a monomer, such as in the case of the naphthalene and ketyl types, or is derived from a monomer but a central core from another monomer is preferred, then the block can be built up by adding at least one desired monomer of the class of

monomers to the preformed dianion. Thus it can be seen that the central block

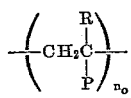

can be derived from a single

or from a multiplicity of monomers such as when 2, 3, 4, or more monomers are introduced. The plurality of monomers can be introduced simultaneously so that random structures are obtained, or the monomers can be introduced consecutively so that regulated internal blocks are present in the central structure of the polymer. Thus

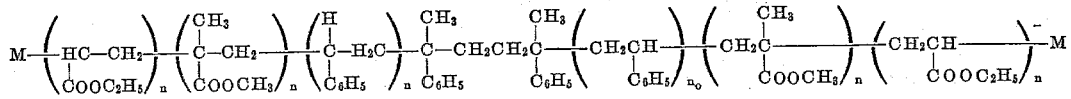

can be produced instead of a random structure.

When the dianion is initially produced from a diene such as butadiene or isoprene, it also becomes part of the polymer chain which thereby contains unsaturation proportional to the amount of dianion, $$M^{+-}(CH_2CH=CHCH_2)_{2'}{}^-M^+$$

in the block, and the value of $n'$ in the initiating dianion. Therefore, it oxidation resistance is desired in the final polymer, it is advisable to maintain the concentration of such interpolymerized initiators to less than 20–30 percent by weight of the final polymer.

For the purposes of this invention, the origin of the initiating dianion or the mechanism by which it is obtained is unimportant, for once the dianionic system is initiated it is responsible for the polymerization of monomers of the formula

to produce a polymeric dianion

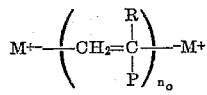

and to this preformed dianion, propagation is continued by the addition of monomers of the formula

to give the block copolymers of the structure,

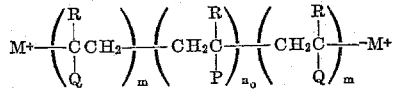

The average molecular weight, as expressed by the average degree of polymerization (DP) of the block copolymer, is given by the equation $$\overline{DP} = \frac{2 \,[\text{Monomers}]}{[M^+]}$$

in which [Monomers] represents the molar concentration of monomers

and

and [M+] represents the molar concentration of the positive cation. Anionic polymerizations are also known as base-catalyzed polymerizations.

The anionic polymerizations can be performed with the monomers in either the first stage, in the preparation of the

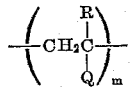

block, or in the second stage in the preparation of the

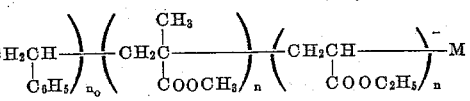

blocks. The monomers can be used by themselves, that is, in undiluted form, or in the presence of liquid diluents at temperatures ranging from about −80° C. to about 100° C., but for most monomers of the range of −40° C. to 80° C. is satifactory. In general −20° C. to about 60° C. is practical. Both stages of the anionic polymerization can be performed at identical temperatures, or the first stage may be performed at either a higher or a lower temperature than the second stage.

The solvents or diluents, when used, may be selected from the class of aliphatic and aromatic hydrocarbons, ketones, ethers and esters such as butane, propane, hexane, heptane, octane, benzene, toluene, xylene, dimethyl ether, diethyl ether, dibutyl ether, tetrahydrofurane, dioxane, diphenyl ether, dibenzyl ether, dimethyl ethylene glycol ether, dibutyl ethylene glycol ether, diethyl diethylene glycol ether, etc. The diluent or solvent can also act to control the molecular weight of the polymerization by solvalitic chain transfer with the anion when protonic solvents are used, thus

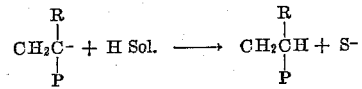

and

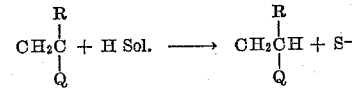

The block copolymers of this invention can possess a very wide utility because of the large number of variables that can be readily controlled in their production. These properties will depend in great measure on the nature and character of the monomers used to prepare the central block

and whether this block is a homopolymeric block of only one

monomer, or a random copolymeric block of two or more

monomers alone or with other monomers, or whether it is a block within a block of two or more

monomers, as well as on the ratio of the total monomers, $n$, in the

block to the total monomers in the

blocks.

In the

block the type of

monomers is important, and its activity will depend on the nature, character, and number of these monomers, on whether one, two or more

monomers are used, and on whether they are added as a block within a block or at random, etc. Accordingly, it may be appreciated that the nature of the

and

monomers is important in the practice of this invention, and it is obvious that they cannot contain in their structures functions which react with or which destroy the initiating system.

Class A monomers are those having only one $$CH_2=C<$$

group and the general formula,

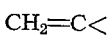

wherein

R is selected from the class consisting of —H, —CH, and —CN;

P is selected from the class of

—Ar, wherein —Ar is selected from the class of aryl radicals containing 6 to 12 carbon atoms and derivatives thereof, in which each derivative group is selected from the class of alkyl, cycloalkyl and aryl groups containing no more than 12 carbon atoms, —Ar—Y′, wherein —Ar— is a divalent radical selected from the class of arylene radicals and derivatives thereof in which each derivative group is selected from the class of alkyl, aryl, cycloalkyl, alkoxy, aryloxyl, thioalkyl, thioaryl, and Y′ represents a radical selected from the class of —OR$^{IV}$, —SR$^{IV}$, —COOR$^{IV}$, —CN, —O(CR$_2^V$)$_n$COOR$^{IV}$, —S(CR$_2^V$)$_n$COOR$^{IV}$
(CR$_2^V$)$_n$COOR$^{IV}$, —(CR$_2^V$)OR$^{IV}$, (CR$_2^V$)SR$^{IV}$
—N(R$^{IV}$)$_2$, —CON(R$^{IV}$)$_2$, -(CR$_2^V$)$_n$N(R$^{IV}$)$_2$
-(CR$_2^V$)$_n$CON(R$^{IV}$)$_2$, —O(R$_2^V$)$_n$CON(R$^{IV}$)$_2$
—NR$^{IV}$(CR$_2^V$)$_n$COOR$^{IV}$, —N[(CR$_2^V$)$_n$COOR″]$_2$

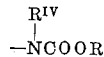

—(OCR$_2^V$CR$_2^V$)$_n$OR$^{IV}$, —CO(OCR$_2^V$CR$_2^V$)$_n$OR$^{IV}$

—N(COOR$^{IV}$)$_2$ and —SO$_2$OR$^{IV}$, wherein R$^V$ is a radical selected from the class of hydrogen and R$^{IV}$, and R$^{IV}$ is a hydrocarbon radical selected from the class of saturated aliphatic and cycloaliphatic radicals and aryl radicals and containing no more than twelve carbon atoms, and $n$ represents an integer having a value of one to ten, —COY″, wherein Y″ is selected from the group consisting of —OR$^{IV}$, —SR$^{IV}$, —(CR$_2^V$)$_n$COOR$^{IV}$, —S(CR$^V$)$_n$COOR$^{IV}$, —O(CR$_2^V$)$_n$OR$^{IV}$
—N(R$^{IV}$)$_2$, —O(CR$_2^V$)$_n$CON(R$^{IV}$)$_2$
—OCR$_2^V$(CR$_2^V$)$_n$(R$^{IV}$)$_2$, —S(CR$_2^V$)$_n$CON(R$^{IV}$)$_2$
—SCR$_2^V$(CR$_2^V$)$_n$N(R$^{IV}$)$_2$, —NCR$_2^V$(CR$_2^V$)$_n$N(R$^{IV}$)$_2$ (OCR$_2^V$CR$_2^V$)$_n$OR$^{IV}$, wherein R$^V$ is selected from the class of H and R$^{IV}$, and R$^{IV}$ is a hydrocarbon radical selected from the class of saturated aliphatic radicals, saturated cycloaliphatic radicals and aromatic radicals and containing no more than twelve atoms, and $n$ represents a numerical value of one to ten.

The structural unit in the polymers derived from the

monomers is

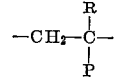

Illustrative examples of Class A monomers are:

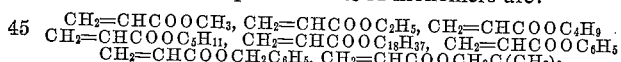
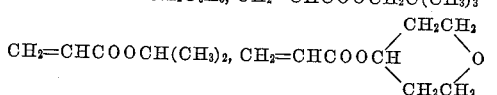
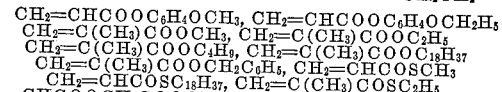
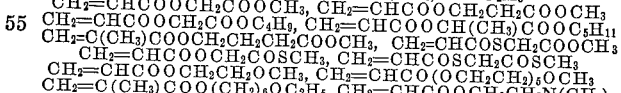
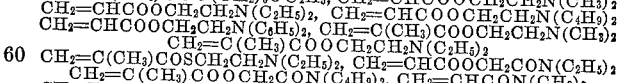
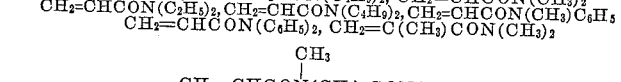
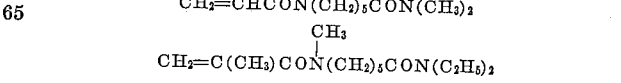
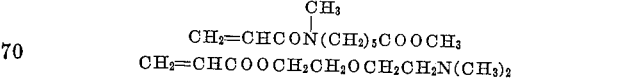
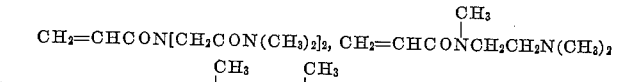
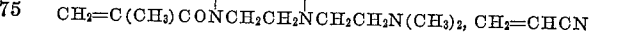

CH₂=C(CH₃)CN, CH₂=C(CN)C₆H₅, CH₂=C(CN)₂
CH₂=C(CN)COOCH₃, CH₂=C(CN)COOC₂H₅
CH₂C=C(CN)COOC₄H₉, CH₂=C(CN)COOC₁₈H₃₇
CH₂=C(CN)COOCH₂CH₂OCH₃, CH₂=C(CN)COOCH₂CH₂OC₂H₅
CH₂=C(CN)COOC₆H₅, CH₂=C(CN)COOCH₂C₆H₅
CH₂=C(CN)COOCH₂COOCH₃, CH₂=C(CN)COSC₂H₅
CH₂=C(CN)COOCH(CH₃)COOC₆H₁₃, CH₂=C(CN)COSCH₂COOCH₃
CH₂=C(CN)CO(OCH₂CH₂)₅OCH₃,
CH₂=C(CN)COOCH₂CH₂N(C₂H₅)₂
CH₂=C(CN)COOCH₂CH₂N(C₄H₉)₂
CH₂=C(CN)COOCH₂CH₂N(C₆H₅)₂
CH₂=C(CN)COSCH₂CH₂N(C₂H₅)₂, CH₂=C(CN)CON(CH₃)₂
CH₂=C(CN)CON(C₂H₅)₂, CH₂=C(CN)CON(C₆H₅)₂
CH₂=C(CN)CON(CH₃)C₆H₅, CH₂=C(CN)CON(C₆H₅)₂
CH₂=C(CN)CON(CH₃)CH₂CH₂N(C₂H₅)₂
CH₂=C(CN)CON[CH₂CON(CH₃)₂]₂, CH₂=CHC₆H₅
CH₂=C(CH₃)C₆H₅, CH₂=CHC₆H₄CH₃, CH₂=CHC₆H₄C₆H₁₂
CH₂=CHC₆H₃(CH₃)₂, CH₂=C(CH₃)C₆H₄CH₃
CH₂=CHC₆H₄CH(CH₃)₂, CH₂=C(CH₃)C₆H₄CH(CH₃)₂

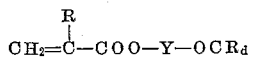

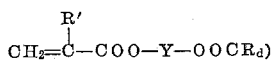

CH₂=CHC₆H₄SC₆H₅, CH₂=CHC₁₀H₇, CH₂=C(CH₃)C₁₀H₇
CH₂=C(CH₃)C₁₀H₆CH₃, CH₂=CHC₆H₄CN, CH₂=CHC₆H₄CH₂CN
CH₂=C(CH₃)C₆H₄CN, CH₂=CHC₆H₄C₁₂H₂₅, CH₂=CHC₆H₄COOCH₃
CH₂=CHC₆H₄COOC₂H₅, CH₂=CHC₆H₄COOC₁₈H₃₇
CH₂=C(CH₃)C₆H₄COOCH₃, CH₂=C(CH₃)C₆H₄COOCH₃
CH₂=C(CH₃)C₆H₄COOC₂H₅, CH₂=CHC₆H₄COSCH₃
CH₂=C(CH₃)C₆H₄COSCH₃, CH₂=C(CH₃)C₆H₄COSC₂H₅
CH₂=CHC₆H₄CH₂COOC₂H₅, CH₂=CHC₆H₄CH₂COOC₂H₅
CH₂=CHC₆H₄CON(CH₃)₂, CH₂=CHC₆H₄CON(C₂H₅)₂
CH₂=(CH₃)C₆H₄CON(C₄H₉)₂, CH₂=CHC₆H₄CON(C₂H₅)₂
CH₂=CHC₆H₄OCH₃, CH₂=CHC₆H₄OC₄H₉, CH₂=CHC₆H₄OC₁₈H₃₇
CH₂=CHC₆H₄OC₆H₅, CH₂=C(CH₃)C₆H₄OCH(CH₃)₂
CH₂=C(CH₃)C₆H₄OC₆H₁₁, CH₂=CHC₆H₄COOCH₂CH₂OCH₃
CH₂=CHC₆H₄COOCH₂CH₂CH₂OC₆H₅,
CH₂=C(CH₃)C₆H₄COOCH₂CH₂OCH₃
CH₂=CHC₆H₄COOCH₂COOCH₃
CH₂=CHC₆H₄COOCH₂CH₂OC₂H₅
CH₂=C(CH₃)C₆H₄COOCH₂CH₂N(CH₃)₂
CH₂=CHC₆H₄COOCH₂CH₂CH₂N(C₂H₅)₂

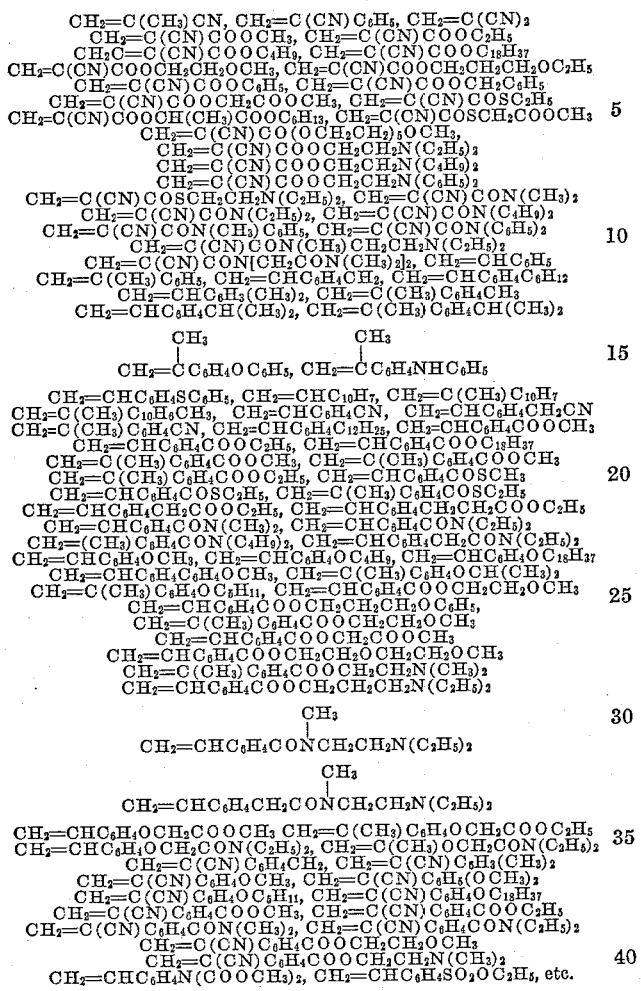

CH₂=CHC₆H₄OCH₂COOCH₃, CH₂=C(CH₃)C₆H₄OCH₂COOC₂H₅
CH₂=CHC₆H₄OCH₂CON(C₂H₅)₂, CH₂=C(CH₃)OCH₂CON(C₂H₅)₂
CH₂=C(CN)C₆H₄CH₂, CH₂=C(CN)C₆H₃(CH₃)₂
CH₂=C(CN)C₆H₄OCH₃, CH₂=C(CN)C₆H₅(OCH₃)₂
CH₂=C(CN)C₆H₄OC₆H₁₁, CH₂=C(CN)C₆H₄OC₁₈H₃₇
CH₂=C(CN)C₆H₄COOCH₃, CH₂=C(CN)C₆H₄COOC₂H₅
CH₂=C(CN)C₆H₄CON(CH₃)₂, CH₂=C(CN)C₆H₄CON(C₂H₅)₂
CH₂=C(CN)C₆H₄COOCH₂CH₂OCH₃
CH₂=C(CN)C₆H₄COOCH₂CH₂N(CH₃)₂
CH₂=CHC₆H₄N(COOCH₃)₂, CH₂=CHC₆H₄SO₂OC₂H₅, etc.

These Class A monomers can be polymerized anionically individually to produce a homoblock or with each other very readily to produce block A as a copolymer structure, as well as less readily with a variety of other monomers containing one or more negative substituents such as vinyl acetate, vinyl propionate, vinyl benzoate, dimethyl fumarate, diethyl fumarate, dimethyl maleate, diethyl maleate, dimethyl itaconate, methyl-β-cyanoethyl acrylate, diallyl maleate, diallyl fumarate, diallyl itaconate, etc., in which case any unconverted monomer can be removed by distillation or extraction, or even be allowed to remain admixed with the polymeric dianion during the second stage of grafting of the B monomers. In other cases, these monomers, which react poorly or very slowly, can be used as the solvent for both phases of the reaction.

The monomers of Class B have the general formula

wherein
R is selected from the class of —H, —CH₃, and —CN,
Q is selected from the class consisting of
—COOR$_d$, wherein R$_d$ is an unsaturated aliphatic hydrocarbon radical containing no less than 16 and no more than 24 carbon atoms and consisting of a terminal —CH₃ group, at least 1 and no more than 4

—CH=CH— groups and the remainder being —CH₂— groups (compounds of the formula

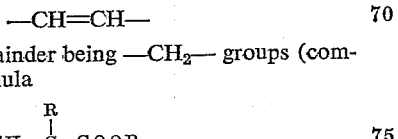

are disclosed in my copending application Serial No. 207,011, filed July 2, 1962);

—COOY—OOCR$_d$, wherein Y is a polyvalent hydrocarbon radical of no more than 20 carbon atoms having a valency of at least 2 and no more than 6, the valencies in excess of those shown in the above formula being occupied by groups selected from the class of R$_d$COO—, R$^a$O— and R$^a$COO— groups in which R$^a$ is a hydrocarbon radical of no more than 24 carbon atoms and R$_d$ is an unsaturated aliphatic hydrocarbon radical containing no less than 16 and no more than 24 carbon atoms and consisting of a terminal —CH₃ group, at least 1 and no more than 4 —CH=CH— groups and the remainder consisting of —CH₂— groups. (Compounds of this formula $$CH_2=\overset{R}{\underset{|}{C}}-COO-Y-OCR_d$$

are disclosed in my copending application, Serial No. 207,012, filed July 2, 1962), but under the formula $$CH_2=\overset{R'}{\underset{|}{C}}-COO-Y-OOCR_d)$$

—Ar—Z—CH₂R$_d$, wherein —Ar— is selected from the class of arylene radicals and the derivatives thereof and the derivatives thereof selected from the class of alkyl, aryl, cycloalkyl, alkoxy, aryloxy, cycloalkoxy, halogen and amino groups, —Z— is a divalent radical connecting said R$_d$ group to said —Ar— group and contains therein only groups selected from the class consisting of hydrocarbon, ester, ether and amino groups, containing no more than 24 carbon atoms, and R$_d$ is an unsaturated aliphatic hydrocarbon radical containing no less than 16 and no more than 24 carbon atoms and consisting of a terminal —CH₃ group, at least 1 and no more than 4 —CH=CH— groups and the remainder consisting of —CH₂— groups. (Compounds of this formula, CH₂=C—Z—CH₂R$_d$ are disclosed in my copending application Serial No. 207,013, filed July 2, 1962);

—Ar—Z—R$_d$, in which —Ar— is selected from the class consisting of arylene radicals and derivatives thereof, in which each derivative is selected from the class consisting of alkyl, aryl, cycloalkyl, alkoxy, aryloxy, cycloalkoxy, halogen and amino groups, —Z— is a divalent radical connecting said —R$_d$ group to said —Ar— group and contains therein groups selected from the class of hydrocarbon, ester, ether and amino groups and R$_d$ is an unsaturated aliphatic hydrocarbon radical containing no less than 16 and no more than 24 carbon atoms and consisting of a terminal —CH₃ group and at least 1 and no more than 4 —CH=CH— groups, and the remainder consisting of —CH₂— groups. (Compounds of this formula, CH₂=C—Z—R$_d$ are disclosed in my copending application, Serial No. 207,013, filed July 2, 1962.)

The structural unit in the polymers, derived from the monomers is

These Class B monomers can be grafted to a dianion block of A monomers, individually or as a mixture of different species of B monomers, or one species of B monomers can be grafted first, followed by a second species to produce a block within the B block, etc.

Illustrative examples of Class B,

monomers are:

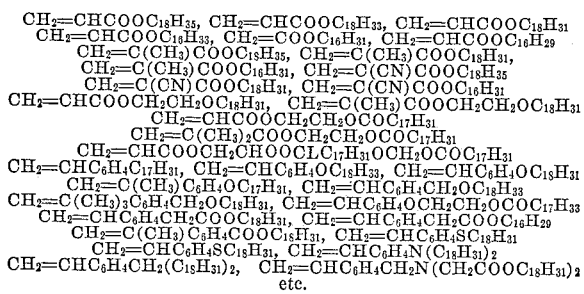
etc.

For economical use as coating compositions, it is wasteful as well as unnecessary to use copolymers of this invention having a high concentration of $R_d$ groups, since the high activity of polymers having such an abundance of air drying functions is not needed in most cases, although they can be used as such in castings for encapulation or impregnation. In most applications copolymers having a lesser amount of $R_d$ groups are preferred, particularly since it was discovered that the air drying property of these monomers is conferred on the copolymers, which may be dipolymers, tripolymers, etc., depending on the number of additional monomers used as well as on the identity of the monomer containing the —$R_d$ groups. For example, this is true in the case where the monomer is prepared from $R_d$ alcohols derived from natural oils such as linseed or oiticica oil will contain five different esters.

In many cases, especially with the pure monomer of the formula

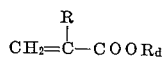

in which $R_d$ contains four —HC=CH— group, copolymers containing 0.5 to 1% of these monomers are useful. However, to achieve better air drying rates, copolymers containing at least 5% are preferable, and when the $R_d$ group contains fewer —CH=CH— groups, 10 to 20% in the copolymer is desirable.

When the monomer is produced from alcohols of oils having a high percentage of saturated higher alcohols, then 50–80% or more are preferable. Accordingly, depending on the end product desired and the use to which it is to be put, copolymers containing as little as 0.5% are useful. When less than 0.5% such as 0.1% is used, then drying is greatly reduced but, in this case, a noticeable plasticizer effect is evident, and in this aspect, these copolymers are useful and valuable. Obviously, those copolymers having more than 0.1% show higher internal plasticization, and when this particular property is desired, it is achieved accordingly by the practice of this invention. Accordingly a wide range of compositions can be made by copolymerizing these monomers with one or more other monomers containing a vinyl, $CH_2=CH$— group, a vinylidene $CH_2=CH<$ group, or a vinylene —CH=CH— group.

The polymers and copolymers of this invention may be used as prepared or blended or compounded with other polymers and ingredients. When prepared and obtained in a viscous liquid form they may be used without solvent for casting, laminating and impregnating uses, or, to lower the resin content and to control or regulate the viscosity, they may be diluted with solvents or emulsified with water and used in a latex form. When obtained as soft resins, they can be diluted or emulsified, or used as melts to coat or impregnate substrates. When prepared as hard polymers they can be used in solution, or in emulsion or in dispersions or as dip-melts, spray-melts, fluidized-melts, etc.

The polymers and copolymers may be blended with other drying, semi-drying or non-drying oils with or without a solvent; or they may, in a similar way, be blended or reacted with alkyd resins modified with drying or semidrying oil acids, oil-soluble phenolic resins, oil modified phenolic resins, etc. They may be used as blends with other film-forming polymers, such as nitrocellulose, polyvinyl acetate, polymethyl methacrylate, polyvinyl chloride and its copolymers, polystyrene and its copolymers, especially the butadiene copolymers, the blends being achieved either in solution or in emulsion, or without solvents.

The polymers and copolymers of this invention, including blends with other polymers, may be converted to varnishes, paints, enamels and impregnants in the usual way and can be mixed with dyes, solvents, pigments, lubricants, stabilizers, etc., as is common in the coating arts. As such, they are useful not only as direct coatings, but are particularly satisfactory for the preparation of oil cloths, electrical oil cloth insulating tapes, rain-coats, linoleums, inks, etc., when fabrics, paper, cloth, cork, mica, etc., are coated or impregnated with these compositions.

When properly prepared, the polymers and copolymers of this invention are colorless or nearly so, if the monomer is colorless or almost colorless, and the dried films are more resistant to yellowing than films prepared from drying oils or drying-oil modified alkyd resins and similar compositions. For this reason, they are especially valuable in the preparation of varnishes and paints for use by artists in art works, portraits, metal gilts, etc.

The following examples illustrate the practice of this invention and are used by way of illustration and not by limitation. All parts and percentages are parts and percentages by weight, unless otherwise specified.

EXAMPLE I

*Part A*

To a reaction flask equipped with a stirrer and necessary accessories, and containing a dry, inert atmosphere of nitrogen, is added 250 parts of purified tetrahydrofurane and 20 milliequivalent of lithium naphthalene (prepared by the process described in J. Am. Chem. Soc., 58, 2442 (1936)) in 6 parts of tetrahydrofurane and the mixture cooled to —77° C. to —78° C. To this greenblack solution, there is added 15.6 parts of styrene (150 milliequivalents) and the color changes to dark red. The solution is then allowed to come to room temperature, and it contains the polystyrene dianion

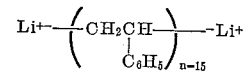

with a $\overline{DP}$ value of about 15 or a molecular weight of about 1550.

The dianionic nature of the polymer is proven readily by reaction with carbon dioxide according to Nature, 178, 1168 (1956) and J. Am. Chem. Soc., 78, 2656 (1956) to give

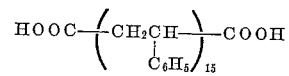

*Part B*

If in this procedure A there is added originally 31.2 parts of styrene, or if an additional 15.6 parts of styrene are added after the original addition, then the dianion will be of an average molecular weight, twice that of the original dianion thus

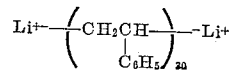

Part C

If a total of 156 parts of styrene in 1500 parts of tetrahydrofurane are used, then the molecular weight of the polymeric dianions is correspondingly larger, thus

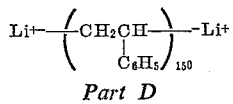

Part D

However, if 15,000 parts of styrene in 25,000 parts of tetrahydrofurane are used, the dianion is

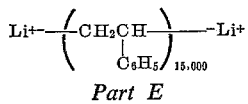

Part E

Alternately, when the amount of initiator is increased, such as when two equivalents of lithium naphthalene are used with 416 parts of styrene in 1200 parts of tetrahydrofurane, the average value of $n$ in the dianion is 4,

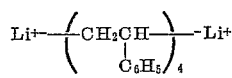

EXAMPLE II

Example I is repeated using equivalent quantities of sodium naphthalene, potassium naphthalene, and cesium anthracene and the corresponding dianions,

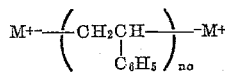

are obtained.

EXAMPLE III

In a suitable reactor containing a dry nitrogen atmosphere, are placed 150 parts of distilled $$CH_2=C(CH_3)C_6H_5$$

and 4 parts of metallic potassium in pellet form, and the reaction allowed to proceed at 15–17° C. for 12 hours with continuous agitation. Then the viscous mixture is filtered to remove any unreacted potassim and the solution consists of about 75 parts of unreacted alpha methyl styrene and about 75 parts of the polymeric dianion,

The excess alpha methylstyrene can be removed by vacuum distillation at a pressure of 1 mm. or less, and the inherent viscosity of 0.5% solution of the isolated polymer in toluene at 25° C. is about 0.74. The excess unreacted alpha methyl styrene can also be separated from the polymeric dianion by extraction with liquid hexane, and the dianion dissolved in tetrahydrofurane for further reaction.

Alternately the procedure of Examples I and II can be used with tetrahydrofurane as the solvent for the reaction and the polymer allowed to remain in solution without isolation and used for further reactions.

When equivalent amounts of lithium or sodium are substituted in the procedure of this example, similar results are obtained. However, the rates differ and their speeds are in the following order K>Li>Na and an increase in reaction time is necessary if higher conversions are required.

EXAMPLE IV

The procedure of Example I is repeated using equivalent amounts of sodium benzophenone and the equivalent polystyrene dianions,

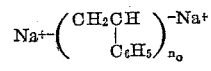

are obtained,

EXAMPLE V

The procedure (Part A) of Example I is repeated using equivalent amounts of acrylonitrile (7.95 parts=150 milliequivalents) and the corresponding polyacrylonitrile dianions,

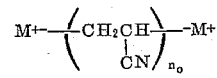

are obtained as precipitates in the tetrahydrofurane. When this procedure is repeated at −50° C. using 250 parts of redistilled dimethyl formamide instead of tetrahydrofurane as the solvent, then the polymeric dianion is obtained in solution.

EXAMPLE VI

Example V is repeated using dimethyl formamide as the solvent and 10.35 parts of methacrylonitrile, and there is obtained in solution the polymeric dianion,

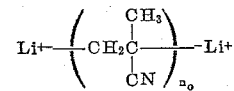

EXAMPLE VII

Example VI is repeated using 14.4 parts of cyanomethyl acrylate and there is obtained the polymeric dianion,

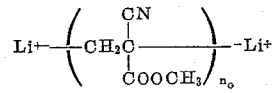

EXAMPLE VIII

Example VI is repeated using 12.75 parts of $$CH_2=CHCON(CH_3)_2$$

and there is obtained the polymeric dianion

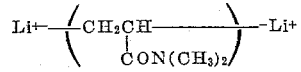

EXAMPLE IX

The procedure (Part C) of Example I is repeated using 129 parts of methyl acrylate instead of styrene and there is obtained the dianionic polymer,

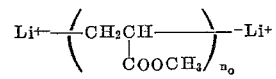

EXAMPLE X

The procedure (Part C) of Example I is repeated using 150 parts of methyl methacrylate instead of the styrene and there is obtained the polymeric dianion

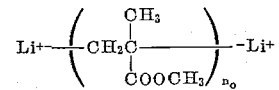

EXAMPLE XI

The procedure (Part B) of Example I is repeated using 43 parts of ethyl acrylate to produce the dianionic polymer,

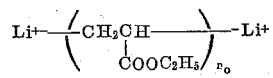

and without isolating the product, 100 parts of ethyl methacrylate are added to produce the A block having the structure,

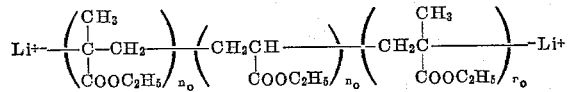

EXAMPLE XII

The procedure (Part B) of Example I is repeated using a monomer mixture of 43 parts of ethyl acrylate and 50 parts of methyl methacrylate and a random copolymer A block containing structure units of both monomers is obtained,

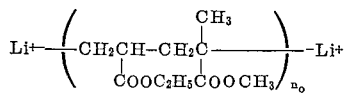

EXAMPLE XIII

The procedure (Part C) of Example I is repeated using 104 parts of styrene, and after the addition of the styrene is completed there is added 172 parts of ethyl acrylate. After its addition is completed there is added 284 parts of butyl methacrylate, and there is obtained the tripolymer block A,

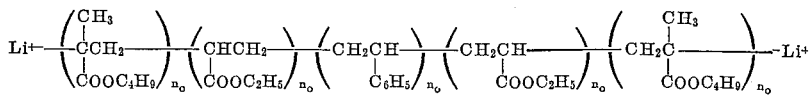

EXAMPLE XIV

To 50 parts of tetrahydrofurane is added 0.75 part of butadiene and 0.14 part of finely divided metallic lithium, and the mixture allowed to stand at room temperature until the metallic lithium disappears and there is obtained a mixture comprising substantially,

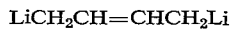

$$LiCH_2CH=CHCH_2Li$$

and to this mixture is added, after cooling to $-40°$ C., 2400 parts of tetrahydrofurane and 1000 parts of styrene. The reaction is continued for 18 hours and there is obtained the dianionic polymer,

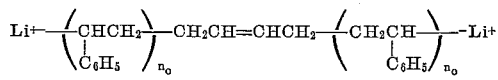

EXAMPLE XV

The procedure of Example V, using dimethyl formamide as the liquid medium containing a mixture of 7.95 parts of acrylonitrile, 2.4 parts of ethyl acrylate and a random copolymer dianion,

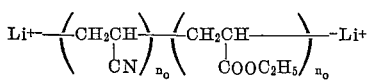

is obtained.

The various other monomers listed above as typical monomers A compounds can be substituted in the procedures of Example I–XV to give corresponding polymer dianions.

EXAMPLE XVI

The formation of the di-block from polymeric dianions is illustrated by using polymer A of Example I by adding to the solution of the dianion, at $-77°$ C., 6.45 parts of linoleyl acrylate and allowing the reaction to proceed for two hours. There is obtained the polymer

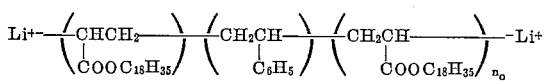

which is confirmed by bromination in toluene of a sample of the polymer isolated by precipitation of an aliquot part of the solution in methanol to give the derivative

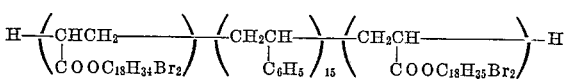

By the further addition to the solution of an additional 91 parts of oleyl acrylate there is obtained the di-block of approximate composition

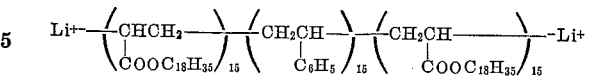

The solution is then neutralized with acetic acid and filtered. To a sample of the solution is added 0.1% by weight based on the weight of the polymer of 10% commercial drier containing lead, manganese and cobalt, and films cast on glass. The solvent is allowed to evaporate at 50° C. and a dried film is obtained in six hours. Tests with benzene, toluene, acetone, dioxane, and ether confirm that the polymer film is insoluble and infusible. In a manner similar to the procedure of this example is linoleyl acrylate added to the polymeric dianions of Examples II to XV inclusive and there are obtained air-drying oxygen-convertible block copolymers.

EXAMPLE XVII

Example XVI is repeated using polymers of Parts B, C, D, and E of Example I with 6.45 parts of linoleyl acrylate followed by an additional 91 parts of linoleyl acrylate, and di-block copolymers containing post-reactive B blocks at the ends of the chains are obtained in all cases.

EXAMPLE XVIII

In an inert atmosphere in a suitable reaction flask is added 200 parts of anhydrous benzene and 90 parts of ethyl acrylate and 4.2 parts of sodium naphthalene in 20 parts of benzene, and the mixture is allowed to react for 12 hours at 25° C. in a thermostatic bath and there is obtained the polymeric dianion,

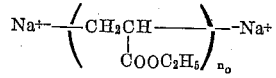

There is then added 10 parts of linoleyl acrylate and the reaction continued for another twelve hours, and there is obtained the block copolymer

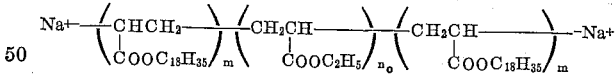

The reaction mixture is then neutralized with glacial acetic acid to give

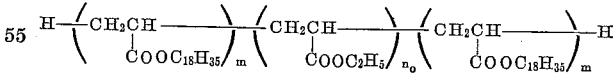

and the solution filtered to remove precipitated salts. The copolymer yield is almost quantitative, the molecular weight is about 11,000, and titration with bromine of a sample of reprecipitated polymer shows that the copolymer contains about 10% of linoleyl acrylate in the copolymer.

To the solution of the polymer is added 0.1% based on the polymer of commercial 10% drier solution containing lead, manganese and cobalt salts in the approximate ratio of 9.6:1.18 as naphthenates. Films are prepared on glass plates and the solvent allowed to evaporate at room temperature. On evaporation of the solvent, a tacky film is formed which is soluble in benzene and acetone, and in six hours becomes converted to a dry, substantially colorless, elastic tough film, insoluble in benzene, acetone, and dioxane. The drying time of the block copolymer of this invention is comparable to the 9 hours required for a random 90–10 copolymer of the same monomers, and with 8 hours for an 80–20 copolymer of these same monomers.

EXAMPLE XIX

The procedure of Example XVIII is repeated using instead of 10 parts of linoleyl acrylate, 10 parts respectively of oleyl acrylate, linolenyl acrylate, linolenyl methacrylate, oleyl methacrylate, and linolenyl methacrylate, and in all cases block copolymers possessing excellent air-drying properties are obtained, with the fastest drying achieved by those block copolymers containing linolenyl esters fractions, while the linoleyl ester types dry faster than the oleyl ester copolymers.

EXAMPLE XX

Example XVIII is repeated using 90 parts of methyl methacrylate instead of ethyl acrylate and a harder copolymer product, which air dries, is obtained.

EXAMPLE XXI

Example XIX is repeated using the polymethyl methacrylate dianion of Example XX and similar excellent results are obtained, except that the films are harder and tougher than the corresponding ethyl acrylate block copolymer.

EXAMPLE XXII

Example XIX is repeated but instead of linoleyl acrylate there is used 10 parts respectively of four esters of the formulas $CH_2=CHCOOR_{dx}$, $CH_2=C(CH_3)COOR_{dx}$, $CH_2=CHCOOR'_{dx}$ and $CH_2=C(CH_3)COOR_{dx}$, in which $R_{dx}$ represents the radical of a mixture of commercial unsaturated alcohols known as Unidol 400, having the following composition.

Unsaturated, 86%: Percent
- Linoleyl alcohol _____ 53
- Linolenyl alcohol _____ 8
- Oleyl alcohol _____ 25

Saturated, 14%:
- Cetyl alcohol _____ 8
- Stearyl alcohol _____ 5
- Arachidyl and others _____ 1 and $R'_{dx}$ represents the radicals of alcohol known as Unidol 900 having the following composition.

Unsaturated, 89%: Percent
- Linoleyl alcohol _____ 17
- Linolenyl alcohol _____ 51
- Oleyl alcohol _____ 21

Saturated, 11%:
- Cetyl alcohol _____ 6
- Stearyl alcohol _____ 5 and di-block copolymers which show drying properties similar to the copolymer of Example XIX are obtained.

EXAMPLE XXIII

The procedure of Example XVIII is repeated seven times using instead of 10 parts of linoleyl acrylate, the indicated parts of the following monomers.

| | Parts |
|---|---|
| $CH_2=CHCOOCH_2CH_2OCOC_{17}H_{29}$ | 20 |
| $CH_2=CHCOOCH_2CH_2OCOC_{17}H_{31}$ | 40 |
| $CH_2=CHCOOCH_2CH_2OCOC_{17}H_{33}$ | 60 |
| $CH_2=C(CH_3)COOCH_2CH_2OCOC_{17}H_{29}$ | 80 |
| $CH_2=C(CH_3)COOCH_2CH_2OCOC_{17}H_{31}$ | 100 |
| $CH_2=C(CH_3)COOCH_2CH_2OCOC_{17}H_{33}$ | 6 |
| $CH_2=CHCOOC_3H_7(OCOC_{17}H_{33})_2$ | 5 | and air-convertible copolymers are obtained in all cases.

EXAMPLE XXIV

The procedure of Example I is repeated 14 times to prepare the polystyrene dianion using 156 parts of styrene, and without isolating the dianion the following monomers are added in the proportions indicated.

| | Parts |
|---|---|
| $CH_2=CHCOOC_{17}H_{29}$ | 20 |
| $CH_2=CHCOOC_{17}H_{31}$ | 27 |
| $CH_2=C(CH_3)COOC_{17}H_{29}$ | 18 |
| $CH_2=CHCOOCH_2CH_2OCOC_{17}H_{29}$ | 42 |
| $CH_2=CHCOOCH_2CH_2OC_{17}H_{29}$ | 50 |
| $CH_2=CHC_6H_4COOC_{18}H_{35}$ | 16 |
| $CH_2=CHC_6H_4COOC_{18}H_{33}$ | 8.5 |
| $CH_2=CHC_6H_4COOC_{18}H_{31}$ | 156 |
| $CH_2=CHC_6H_4COOCH_2CH_2OOCC_{18}H_{31}$ | 20 |
| $CH_2=C(CH_3)C_6H_4COOC_{18}H_{33}$ | 10 |
| $CH_2=CHC_6H_4OC_{17}H_{31}$ | 10 |
| $CH_2=CHC_6H_4OC_{17}H_{29}$ | 15 |
| $CH_2=CHC_6H_4CH_2OC_{17}H_{29}$ | 74 |
| $CH_2=CHC_6H_4CH_2C_{17}H_{29}$ | 79 |

These solutions are neutralized with acetic acid and driers added according to the procedure of Example XVIII, and in all cases convertible di-block copolymers are obtained which air-dry when cast as films.

EXAMPLE XXV

Example XXIV is repeated using 170 parts of α-methyl styrene instead of 156 parts of styrene, and similar air drying results are obtained with the di-block copolymers.

By using the appropriate monomer A and monomer B in the above procedures the various block copolymers of this invention can be prepared. For example, when styrene is used as monomer A, a central polymer portion of the structure

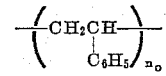

are prepared and two terminal portions are added according to the particular monomer B used, such as,

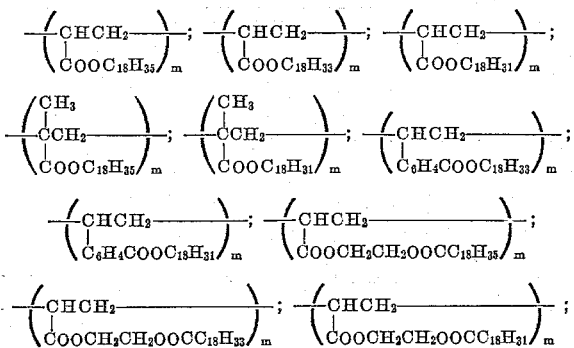

etc.

Likewise α-methyl styrene gives a central polymer portion of the structure

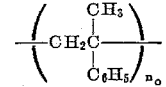

and terminal portions such as those of the preceding paragraph are similarly attached thereto.

EXAMPLE XXVI

Linseed oil is heat polymerized at 290° C. under an inert atmosphere for 16 hours, then the experiment is repeated using a mixture of 90% by weight of linseed oil and 10% by weight of the copolymer of Example XVIII, and the viscosities of the stand-oil and polymer modified stand-oil are compared in Table 1.

TABLE 1

| Time in hours | Viscosity of oil in Process | Viscosity of oil plus polymer |
|---|---|---|
| 1 | 1.15 | 3.4 |
| 2 | 1.59 | 28.6 |
| 4 | 3.5 | 67.6 |
| 6 | 9.2 | 147.2 |
| 8 | 24.0 | 197.6 |
| 10 | 82.0 | 391.4 |
| 12 | 196.0 |  |
| 16 | 390.0 |  |

It will be noted that the addition of polymer to the oil causes a more rapid increase in the viscosity of the resulting stand-oil, and that at least 16 hours of heating are required by the unmodified oil to attain a viscosity equal to about ten hours heating of the polymer-modified oil. The same improvement in a reduction of the time required to prepare stand oils from tung, perilla, oiticica, corn, hempseed, safflower, sandal seed and sunflower oil is observed when the polymers of this invention are added to the oil before heat treatment. Depending on the oil, the modified stand oil is prepared at temperatures varying from 240° C. to 310° C. and for periods of time varying from 1 to 12 hours, a factor which is also controlled by the amount of polymer added to the oil, and a reduction in the heating time is noted when the other polymers of Examples VII and VIII to XIV are added to oil before or during the heat processing. The modified stand oils can be formulated into varnishes by dilution with solvents to which is added metallic driers, or they may be emulsified after drier addition and used in emulsion form.

EXAMPLE XXVII

To fifty part of a long oil glyceryl phthalate alkyd resin containing 55% of combined linseed oil fatty acids in toluene is added 25 parts of a 50% solution in toluene of the linolenyl acrylate copolymer of Example XIX and the drier content adjusted to 0.1% of metal content on the basis of polymer content. Films of this varnish dry in 2.5 hours whereas films prepared from this alkyd resin are not dry in 5.5 hours. A marked improvement in drying time is also shown when the polymers of Example XXI to XXV are added in various amounts to a long oil glyceryl phthalate alkyd resin; and an even greater improvement is noted when these polymers are added to a short oil alkyd resin containing about 40% of combined linseed oil fatty acids.

EXAMPLE XXVIII

Linseed oil of specific gravity 0.9290, and containing 0.05% soluble lead salts and 0.08% soluble manganese salt, is heated to 80° C. while a stream of air is blown through it for 20 hours and a "boiled oil" of gravity 0.940 is obtained. When the process is repeated with a mixture of the same oil containing 10% of copolymer of Example XVIII, a boiled oil of the same gravity is obtained in 14 hours.

EXAMPLE XXIX

To 10 parts of the copolymer of Example XVIII is added 6 parts of solid para-phenyl phenol-formaldehyde resins (known as Bakelite BR–254) and the mixture heated to 220° C. until a clear melt results when a drop is removed and placed on a glass plate, after which it is dissolved in 35 parts of a solvent mixture of a ratio 2 parts of white spirits and 1 part of toluene containing 0.1 part based on the polymer, of commercial metal driers. A film cast from this solution dried to a tack-free glassy, water-resistant film in 2–3 hours.

Similar good results are obtained when tertiary butyl phenol-formaldehyde resin is used instead of the phenyl-phenol resin.

EXAMPLE XXX

A flat enamel is prepared according to standard procedures in the painting art containing 55% pigment and 45% vehicle in the following proportions.

Total pigment comprising 55%:                    Percent
   Titanium pigment _____ 52.2
   Calcium carbonate _____ 36.0
   Diatomaceous silica _____ 4.8
   Zinc stearate _____ 1.98
Total vehicle comprising 45%:
   Polymer Example XX _____ 20.0
   Polymer stand oil of 391.4 viscosity of Example XXIII _____ 5.2
   Solvent (50–50 mineral spirits-toluene) containing 0.15 part metal driers _____ 74.8

A sized plaster surface is coated with this paint and dries in about 3 hours, appearing as very white satin finish and has excellent water resistance. It can be rewashed repeatedly.

EXAMPLE XXXI

A commercial acrylic latex paint is applied (without first applying the sizing undercoat recommended when a latex is applied over oil-type paints) to wood previously coated with a drying oil-alkyd type paint and aged for at least 3 months, and allowed to air-dry for 24 hours and then exposed to the weathering. To another part of the same acrylic latex is added 5% by weight of the copolymer of Example XVIII (previously emulsified as a 40% emulsion in water with dodecylbenzene sodium sulfonate) and applied in the same way as the unmodified acrylic latex. At the end of six months peeling and blistering is observed in the film with the commercial latex, whereas the modified latex coating is continuous and intact.

In a similar manner vinyl acetate and styrene-butadiene latices can be modified by the addition of the polymers of this invention to improve their properties.

EXAMPLE XXXII

A mixture of 70 parts of asphaltic bitumen (M.P. 90° C.) and 30 parts of polymer of Example XVIII are heated at 100° C. for 15 minutes and then diluted with 70 parts of solvent mixture containing 80% white gasoline and 20% benzene and 0.03 part of metallic driers.

This solution is used to coat tin plate and allowed to dry for 6 days. A similar solution of the asphaltic bitumen is prepared without including the polymer of Example XVIII and air dried for a similar period of time. When both plates are placed in an oven and the temperature raised to 95° C., the coating not containing polymer sags and flows, whereas the solution containing the polymer does not sag or flow. Mixtures of asphaltenes of this type with the polymers of this invention, are particularly suitable for the preparation of gutter paint, rust proofing and water resistant coatings for underground pipes of all kinds including iron, brass, copper, and for exposed metal, ceramic, clay, wood, wall board, concrete and stone surfaces, as well as for the preparation of asphalt shingles, roofing paper, etc. Instead of the asphaltic bitumen, other bitumens such as blown asphaltic bitumens, stearine pitches, grahamite (an asphaltum from Virginia and Oklahoma), Gilsonite (an asphaltum from Utah), coal tar pitches, etc., can also be modified by the polymers of this invention to improve their flow properties.

EXAMPLE XXXIII

To 30 parts of polymer of Example XVIII is added 1.5 parts of sodium dioctyl sulfosuccinate and the mixture heated with agitation at 100° C. until a uniform mixture is obtained, following which there is added 70 parts of water heated to 70° C. and a smooth emulsion is obtained. The addition of metallic driers such as the water soluble salts of a mixture of cobalt, lead and manganese acetates produces a latex varnish which air dries within four hours when laid down as a film on glass, iron, and aluminum plates. The latex can be pigmented in the usual way to produce high gloss enamels, satin-finish enamels, or semi-glass and flat-finish paints; or it can be added to other preformed latex paints such as the styrene-butadiene-, acrylic- or vinyl-latex paints to improve their adhesion properties.

While certain features of this invention have been described in detail with respect to various embodiments thereof, it will, of course be apparent that other modifications can be made within the spirit and scope of this invention, and it is not intended to limit the invention to the exact details shown above insofar as they are defined in the following claims.

The invention claimed is:

1. A block copolymer having the structure

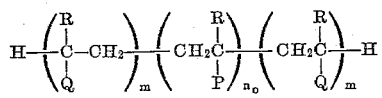

wherein $n_0$ represents an integer having a value of at least 4;
$m$ represents an integer having a value of at least 1;
R is a radical selected from the group consisting of —H, —CH$_3$ and —CN;
P is a radical selected from the group consisting of —Ar, —Ar—Y' and —CO—Y'';
Q is a radical selected from the group consisting of —COOR$_d$, —COO—Y—OOCR$_d$, Ar—Z—CH$_2$R$_d$ and —Ar—Z—R$_d$;
—Ar is a radical selected from the class consisting of aryl radicals containing 6 to 12 carbon atoms and derivatives thereof in which each derivative group is selected from the class consisting of alkyl, cycloalkyl and aryl groups containing no more than 12 carbon atoms;
—Ar'— is a divalent radical selected from the class consisting of arylene radicals containing 6 to 12 carbon atoms and derivatives thereof in which each derivative group is selected from the class consisting of alkyl, aryl, cycloalkyl, alkoxy, aryloxy, thioalkyl, and thioaryl radicals containing no more than 12 carbon atoms;
—Y' represents a radical selected from the class consisting of —OR$^{IV}$, —SR$^{IV}$, —COOR$^{IV}$, —CN, —O(CR$_2^V$)$_n$COOR$^{IV}$, —S(CR$_2$)$_n^V$COOR$^{IV}$, —(CR$_2^V$)$_n$COOR$^{IV}$, —(CR$_2^V$)$_n$OR$^{IV}$, —(CR$_2^V$)$_n$SR$^{IV}$, —(CR$_2^V$)$_n$CON(R$^{IV}$)$_2$, —O(CR$_2^V$)$_n$CON(R$^{IV}$)$_2$, —NR$^V$(CR$_2^V$)$_n$COOR$^{IV}$, —(OCR$_2^V$CR$_2^V$)$_n$OR$^{IV}$, —CO(OCR$_2^V$CR$_2^V$)$_n$OR$^{IV}$, —N(COOR$^{IV}$)$_2$, $$-\overset{R^{IV}}{\underset{|}{N}}COOR^{IV}$$

—N[CR$_2^V$)$_n$COOR$^{IV}$]$_2$, and —SO$_2$OR$^{IV}$;
—Y'' is selected from the group consisting of —OR$^{IV}$, O(CR$_2^V$)COOR$^{IV}$, —S(CR$_2^V$)COOR$^{IV}$, —O(CR$_2^V$)$_n$OR$^{IV}$, —N(R$^{IV}$)$_2$, —O(CR$_2^V$)$_n$CON(R$^{IV}$)$_2$, —OCR$_2^V$(CR$_2^V$)$_n$N(R$^{IV}$)$_2$, —S(CR$_2^V$)$_n$CON(R$^{IV}$)$_2$, —SCR$_2^{IV}$(CR$_2^{IV}$)$_n$N(R$^{IV}$)$_2$, $$-\overset{R^V}{\underset{|}{N}}CR_2^V(CR_2^V)_nN(R_2^{IV})_2,$$

and —(OCR$_2^V$CR$_2^V$)$_n$OR$^{IV}$;

$n$ represents a numerical value of 1 to 10;
R$_d$ is an unsaturated aliphatic hydrocarbon radical containing no less than 16 and no more than 24 carbon atoms, and consisting of a terminal —CH$_3$ group, at least one and no more than 4 —CH=CH— groups, and the remainder consisting of —CH$_2$— groups;

—Y— is a polyvalent hydrocarbon radical of no more than 20 carbon atoms having a valency of at least 2 and no more than 6, the valencies in excess of those shown in the formula —COO—Y—OOCR$_d$ being occupied by groups selected from the class of R$_d$COO—, R$^a$O— and R$^a$COO— groups, in which R$^a$ is a hydrocarbon radical containing no more than 24 carbon atoms;
—Z— is a divalent hydrocarbon radical connecting the —R$_d$ group to the —Ar— group and containing therein groups selected from the class consisting of hydrocarbon, ester and amino groups containing no more than 18 carbon atoms;
R$^{IV}$ is a hydrocarbon radical selected from the class consisting of saturated ailphatic and cycloaliphatic radicals and aryl radicals, containing 1 to 12 carbon atoms; and
R$^V$ is a radical selected from the class of hydrogen and —R$^{IV}$.

2. A block copolymer of claim 1 having the structure

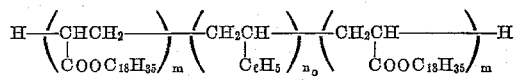

wherein $m$ and $n_0$ are as defined in claim 1.

3. A block copolymer of claim 1 having the structure

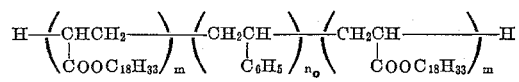

wherein $m$ and $n_0$ are as defined in claim 1.

4. A block copolymer of claim 1 having the structure

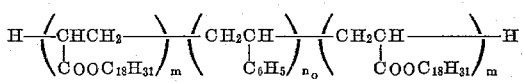

wherein $m$ and $n_0$ are as defined in claim 1.

5. A block copolymer of claim 1 having the structure

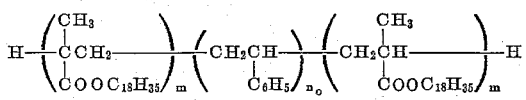

wherein $m$ and $n_0$ are as defined in claim 1.

6. A block copolymer of claim 1 having the structure

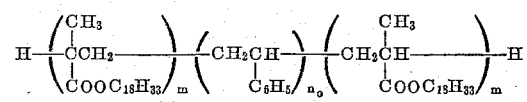

wherein $m$ and $n_0$ are as defined in claim 1.

7. A block copolymer of claim 1 having the structure

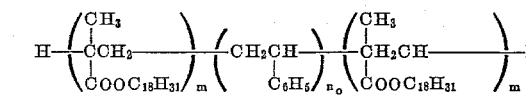

wherein $m$ and $n_0$ are as defined in claim 1.

8. A block copolymer of claim 1 having the structure

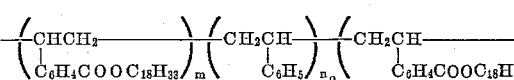

wherein $m$ and $n_0$ are as defined in claim 1.

9. A block copolymer of claim 1 having the structure

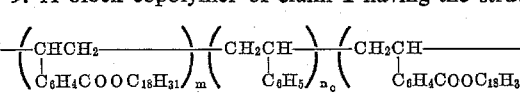

wherein $m$ and $n_0$ are as defined in claim 1.

10. A block copolymer of claim 1 having the structure

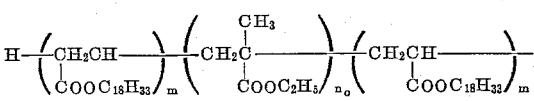

wherein $m$ and $n_0$ are as defined in claim 1.

11. A block copolymer of claim 1 having the structure

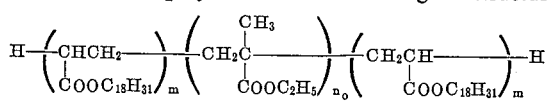

wherein $m$ and $n_o$ are as defined in claim 1.

12. A block copolymer of claim 1 having the structure

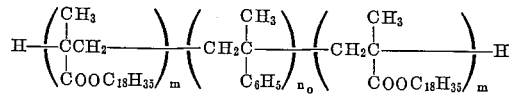

wherein $m$ and $n_o$ are as defined in claim 1.

13. A block copolymer of claim 1 having the structure

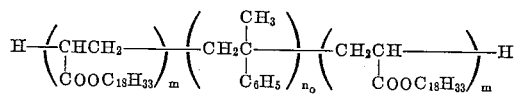

wherein $m$ and $n_o$ are as defined in claim 1.

14. A block copolymer of claim 1 having the structure

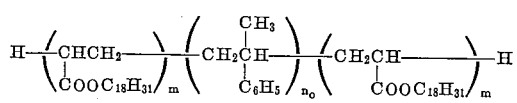

wherein $m$ and $n_o$ are as defined in claim 1.

15. A block copolymer of claim 1 having the structure

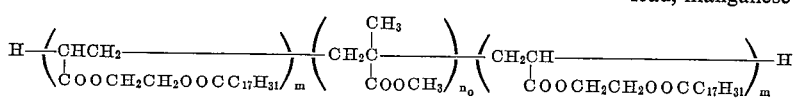

wherein $m$ and $n_o$ are as defined in claim 1.

16. A block copolymer of claim 1 having the structure

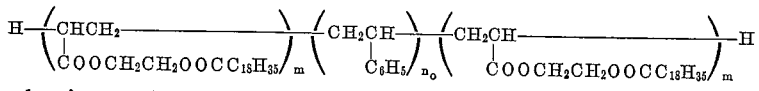

wherein $m$ and $n_o$ are as defined in claim 1.

17. A block copolymer of claim 1 having the structure

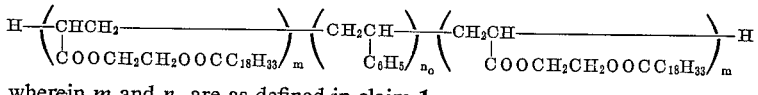

wherein $m$ and $n_o$ are as defined in claim 1.

18. A block copolymer of claim 1 having the structure

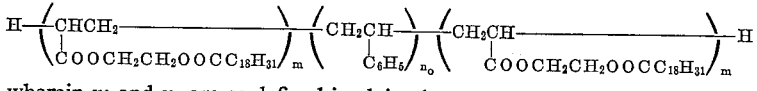

wherein $m$ and $n_o$ are as defined in claim 1.

19. The process of preparing the block copolymer of claim 1 which comprises reacting at least one monomer of the structure

to a polymeric dianion of the structure

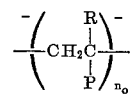

said reaction being conducted at a temperature in the range of −80° C. to 100° C. and said monomer being present in a proportion sufficient to provide at least two molecules of monomer per each anion of said polymeric dianions.

20. The process of converting the block copolymer of claim 1 to the insoluble, infusible state which comprises exposing the polymer to a gas containing oxygen.

21. The process of converting the block copolymer of claim 20 to the insoluble, infusible state in the presence of air and a metal catalyst selected from the class of lead, manganese and cobalt salts.

References Cited by the Examiner

UNITED STATES PATENTS

| | | | |
|---|---|---|---|
| 2,160,532 | 5/1939 | Barrett et al. | 260—17 |
| 2,593,444 | 4/1952 | Harrison | 260—89.5 |
| 3,069,380 | 12/1962 | Nozaki | 260—885 |
| 3,078,254 | 2/1963 | Zelinski et al. | 260—885 |

FOREIGN PATENTS

| | | |
|---|---|---|
| 653,696 | 12/1962 | Canada. |
| 856,581 | 12/1960 | Great Britain. |
| 1,105,172 | 4/1961 | Germany. |
| 1,114,323 | 9/1961 | Germany. |

MURRAY TILLMAN, *Primary Examiner.*

J. C. BLEUTGE, *Assistant Examiner.*